Feb. 17, 1959  A. H. FROHLICH ET AL  2,873,802
CUT-OFF MACHINERY FOR FABRIC PLIES
Filed Oct. 31, 1955  3 Sheets-Sheet 3

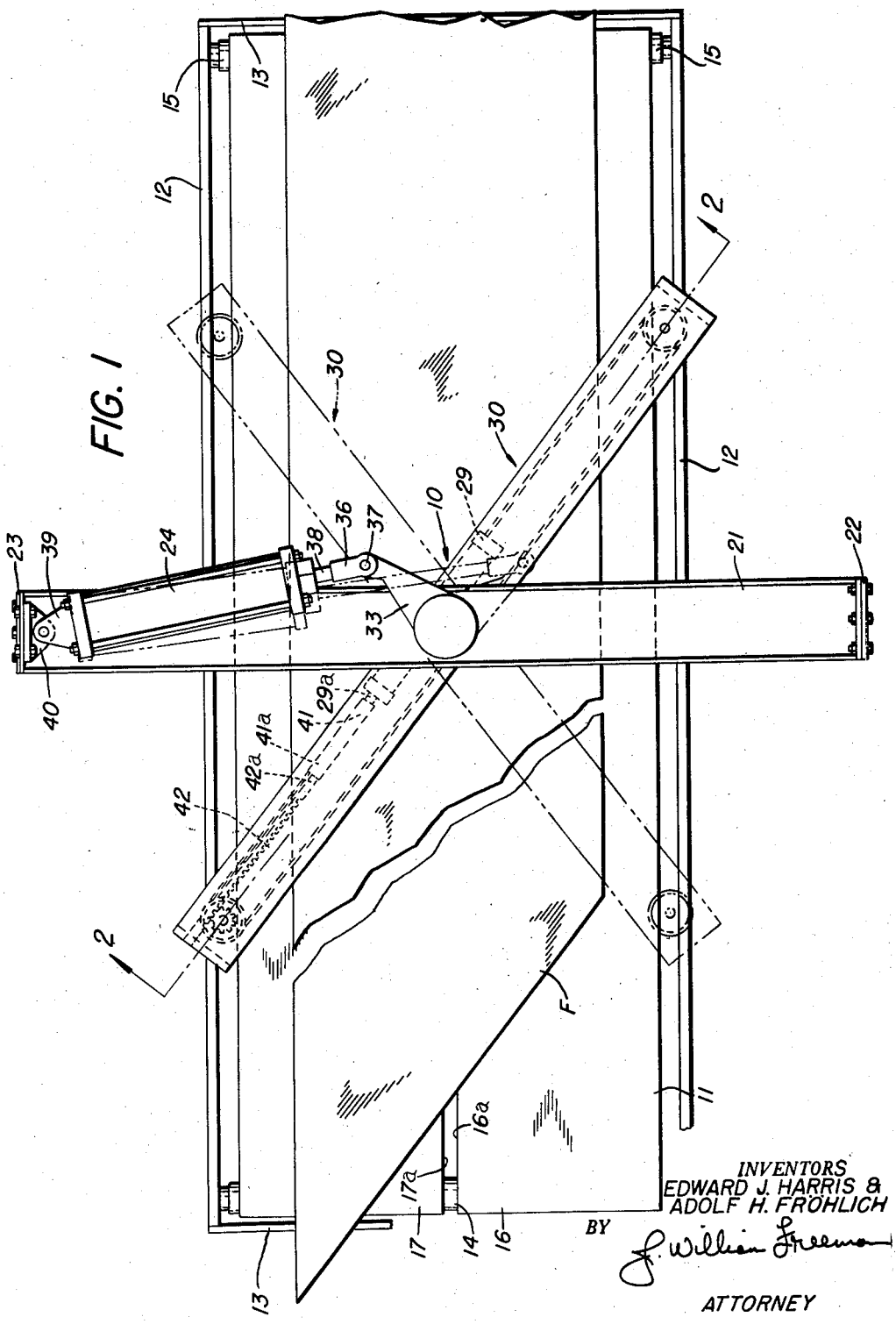

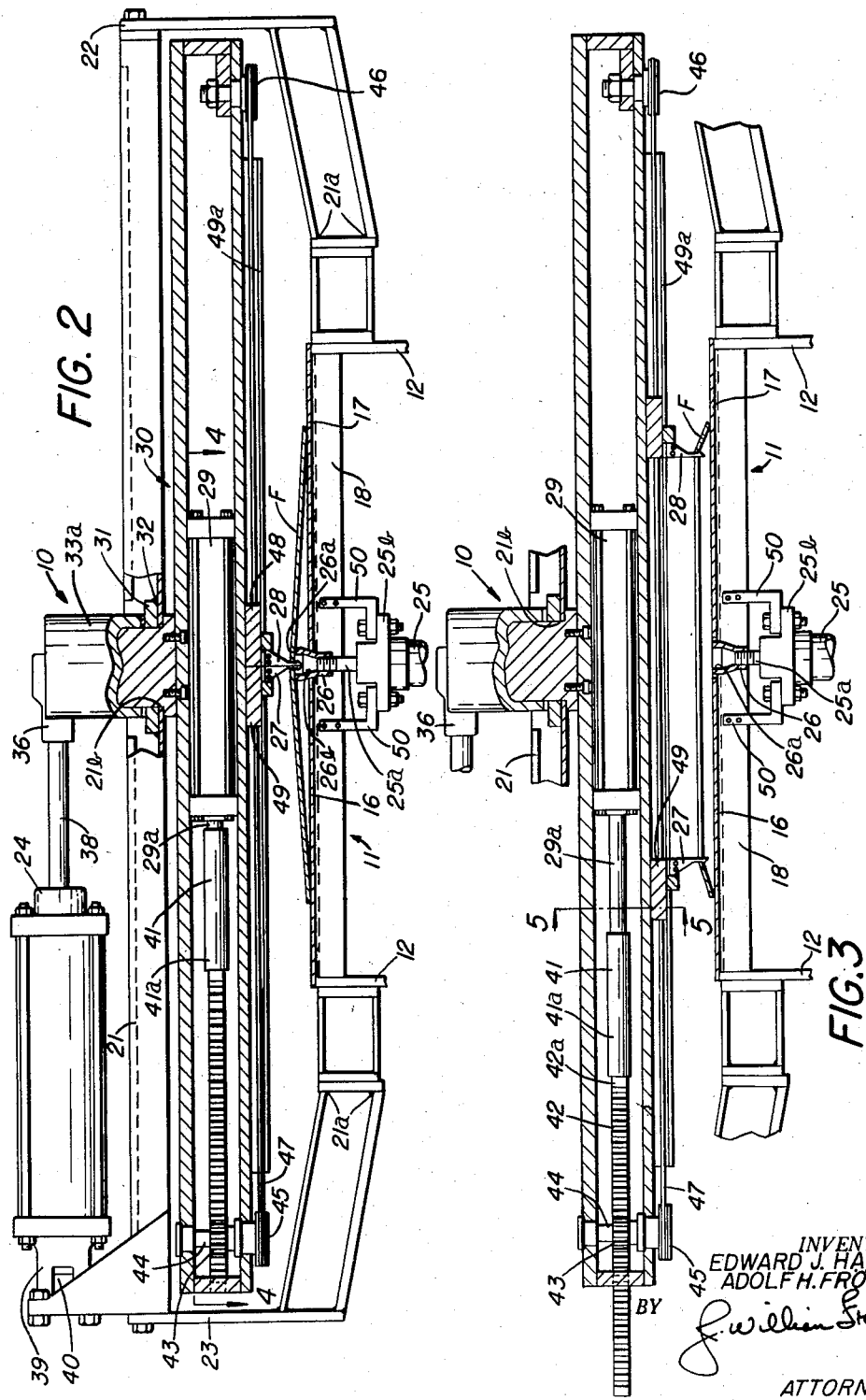

INVENTORS
EDWARD J. HARRIS &
ADOLF H. FROHLICH
BY J. William Freeman
ATTORNEY

United States Patent Office 2,873,802
Patented Feb. 17, 1959

2,873,802
CUT-OFF MACHINERY FOR FABRIC PLIES

Adolf H. Frohlich, Hannover, Germany, and Edward J. Harris, Akron, Ohio, assignors to The Cleveland Trust Company, Cleveland, Ohio, as trustee Application October 31, 1955, Serial No. 543,962

11 Claims. (Cl. 164—75)

This invention relates to the art of cut-off equipment, and in particular has reference to equipment that functions to cut fabric plies to predetermined lengths for subsequent delivery to tire building equipment, in known manner.

In the manufacture of pneumatic tires, the manufacturing process encompasses the use of a plurality of fabric plies that are built up around a building drum or core so as to form what is conventionally known in the trade as a "flat-built" tire.

Because of strength requirements, each fabric ply includes a plurality of parallel disposed cords that are encased in rubber. To give added strength to the tires, the cords of successive plies run in opposite direction to each other in known manner, and accordingly, the fabric ply that is to be delivered to the building drum must be fed to the tire building machine so that the cords of successive plies are disposed at opposite angles to each other.

In the known prior art, fabric plies are supplied to the operator of the tire building equipment on a magazine-type of tire servicer and a length is withdrawn from the appropriate reel by the operator and then a slight cut is made between parallel cords of the extended ply, and the remainder of the cut is effectuated by having the operator tear or rip the fabric ply so as to separate the ply between parallel cords. Because of the manual nature of the operation, there is invariably involved a considerable degree of human error, which results in the fabric strip being either too long or too short, dependent upon the circumstances involved.

As an additional disadvantage of the known prior art, it has been found that with the advent of certain recently introduced cord members such as nylon and wire, that the above-described manual tearing operation becomes increasingly difficult, with the result that ragged edge portions are provided on the longitudinal ends of the fabric piece when known prior art methods are attempted to be used.

Various proposals have been advanced by the prior art in an attempt to obviate the above-described manual operation. However, because of the inherent tacky nature of the fabric ply, and the inability to hold the same with respect to the cutting surface, these efforts have heretofore been a failure, with the result that the great majority of fabric plies are, at the present time, still manually cut or severed in the manner above described.

In co-pending application Serial No. 470,918 filed November 24, 1954, by Edward J. Harris, there was described as a component part of the overall servicing equipment, a cut-off mechanism that was designed to supply predetermined lengths of fabric ply to a tire building machine. The cutter mechanism described in this co-pending application contemplated the use of a knife edge that moved transversely of the advancing fabric ply at an oblique angle thereto, so as to effectuate a cutting action between the parallel cord members thereof. Hold-down means, in the form of a clamping mechanism were provided in this disclosed form of the invention.

However, it has been discovered that while the above-described cut-off mechanism operates satisfactorily, that improved results can be obtained if a plurality of complemental cutting knives are suspended centrally of the fabric ply to be cut and then separated so as to make a transverse cut of the fabric ply at an oblique angle. Specifically, it has been found that a pair of cutting knives of this type, when separated as described, work against each other, so as to provide the requisite degree of holding tension needed to effectuate such a severance of the material involved.

It accordingly becomes a principal object of this invention to provide a cut-off mechanism for fabric plies that envisions the use of a pair of cutting knives that separate from each other under pressure to effectuate a cutting action of the fabric ply.

It is a further object of this invention to provide a mechanism of the type above described that is characterized by the fact that the same can be easily adjusted between a relatively wide angular range, so as to effectuate bias cuts in opposite directions.

It is a still further object of this invention to provide a cut-off mechanism that can be employed in a plurality of locations, including use on servicing equipment or cut-off tables provided especially for this purpose.

These and other objects of the invention will become more apparent upon a reading of the following brief specification, considered and interpreted in the light of the accompanying drawings.

Of the drawings:

Figure 1 is a plan view, partly broken away and in section and illustrating the improved cut-off machinery installed on a table provided for this purpose.

Figure 2 is a sectional view taken on the lines 2—2 of Figure 1 and showing the twin cutting knives in the abutted position prior to the cutting operation.

Figure 3 is a view similar to Figure 2, but illustrating the twin cutting knives as being partially separated during the cutting operation.

Figure 4:
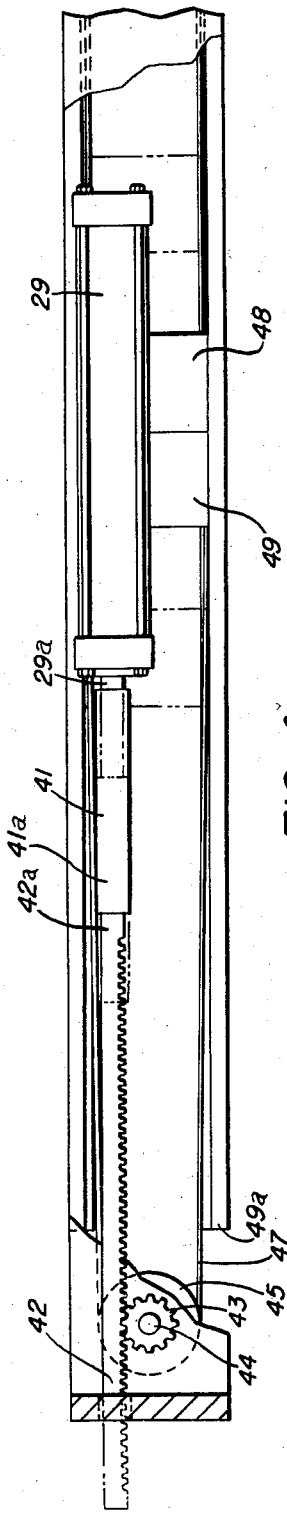
Figure 4 is a view taken on the lines 4—4 of Figure 2.

Referring now to the drawings, and in particular to Figure 1 thereof, the improved cut-off device, generally designated by the numeral 10, is shown disposed transversely of a cutting table 11 so as to be movable between the full and chain-dotted line position of Figure 1 to effectuate a selective cut-off operation on an advancing fabric ply F.

The cutting table 11 is shown in the preferred embodiment of the invention as being of rectangular configuration, and includes a top frame portion that is defined by side rails 12, 12 and end rails 13, 13. Pairs of longitudinally-spaced rollers 14, 14 and 15, 15 that are respectively located adjacent end rails 13, 13, support endless belts 16, 17 thereon; the arrangement being such that these belts 16 and 17 have their edge portions 16a, 17a slightly spaced from each other adjacent the longitudinal center line of the table 11, for purposes to be described. Similarly, a tie rod 18, extending transversely of the table 11 between side rails 12, 12, is provided for the purpose of supporting certain component parts of the cut-off device 10, in a manner to be described.

While the cutting table 11 has been described as being presented in the form of a support frame having a horizontal working surface, it is to be understood that the above-described component framework thereof could be located at any place; and specifically in this regard, it is to be understood that the inclined surfaceway of the servicing apparatus set forth in co-pending application Serial No. 470,918, filed November 19, 1954, by Edward J. Harris, could be utilized for supporting the mechanism of this invention with the fabric ply moving downwardly on an inclined surface.

Turning now to a consideration of the cut-off mechanism 10 per se, it will be seen that the same includes an elevated frame member 21 that extends transversely of the table 11 between appropriate supports 22, 23 thereof so as to provide a pivotal support adjacent the central portion thereof for a swingable cutter arm 30 that is movable upon actuation of piston 24 between the chain-dotted line position of Figure 1. The actual reversing action occurs upon movement of a second piston 25 that actuates a tapered bushing 26 so as to lift the fabric to the position of Figure 2 and thus cause the same to be suspended over the twin knives 27, 28 that are reciprocal longitudinally of cutter arm 30, between the positions of Figures 2 and 3 upon actuation of piston 29.

Considering first the detailed structure of the frame members 21, 22 and 23, it will be seen that the frame members 22 and 23 are respectively secured by welds 21a, 21a to side rails 12, 12 so as to extend outwardly from the edge portions thereof to provide support for the axial ends of the transversely extending frame member 21, as best shown in Figures 2 and 3 of the drawings. To the end of supporting the swingable cutting arm 30, the frame member 21 is centrally apertured as at 21b and has a bushing 31 secured in this area by weld 32 so as to provide a pivot point for the bell crank arm 33 which moves in unison with arm 30.

To the end of effectuating pivotal movement of the bell crank arm 33, the arm 33 is shown as having a pivotal socket member 36 secured about pivot point 37; the arrangement being such that the ends 38 and 39 of piston 24 can be respectively secured to socket 36 and bracket 40 as shown in the drawings. In this manner, expansion of the piston 24 between the full and chain-dotted line position of Figure 1 will result in swinging of the cutter arm 30 about its axis as the same is defined by opening 21b of frame 21.

As previously indicated, the twin cutting knives 27 and 28 are movable between the positions of Figure 2 and Figure 3 as the result of expansion of piston 29. To the end of effectuating such movement, the end 29a of piston 29 is shown threaded into a spacer link 41 that has the opposite end 41a thereof secured to the free end 42a of a gear rack 42. This gear rack 42 is shiftably supported in known manner by certain component parts of the cutting arm 30 and is arranged to mesh with a gear ring 43 that is mounted on shaft 44 so that rotation of gear ring 43 will result in similar rotational movement of a larger diameter pulley 45 (see Figure 4). A second pulley 46 is provided adjacent the opposite end of the cutting arm 30; and around these pulleys 45 and 46 is played an endless cord or chain 47. This chain 47 carries blocks 48 and 49 that respectively support the twin cutting knives 27 and 28; and by placing blocks 48 and 49 in guideway 49a so that the same connect to opposite portions of the positioned chain 47 around the pulley 45, it is apparent that rotational movement of the pulley 45 will operate to separate the twin knives 27 and 28 to the position shown in Figure 3 of the drawings.

Figure 6:
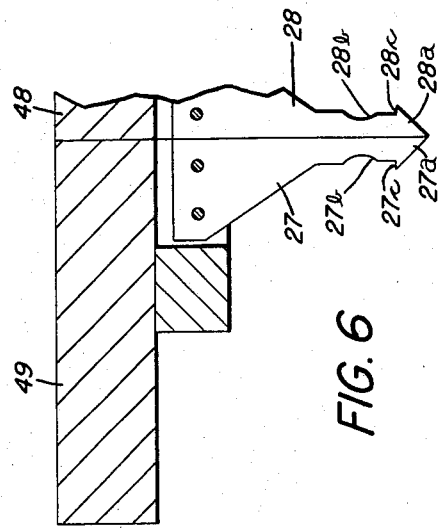
Figure 6 is an enlarged view of one cutting knife.
Figure 5:
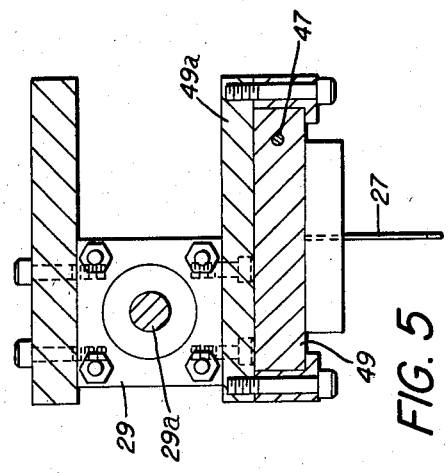
Figure 5 is a view taken on the lines 5—5 of Figure 3.

While the twin knives 27, 28 are mounted in known manner on blocks 48 and 49, respectively, as shown in Figure 6 of the drawings, the construction of these cutting knives is such that each includes a piercing surface 27a, 28a, a knife-edge cutting surface 27b, 28b, and a supporting or carrying surface 27c, 28c. To accomplish the above desired construction, each cutting knife 27, 28 is shown as having the head portion thereof formed in the shape of an arrow so that the piercing surfaces 27a, 28a represent the point of the arrow, while cutting surfaces 27b, 28b is represented by the vertical segments of the same, with the horizontal surfaces acting as the support surfaces 27c, 28c.

As previously indicated, the tapered bushing 26 is shiftable axially as a result of its attachment to the projecting end 25a of piston 25; the latter piston having the flange portions 25b thereof supported by the usual brackets 50, 50 that connect to tie rod 18, as is best shown in Figure 2 of the drawings. This bushing 26 is designed to be received between the edge portions of the endless belts 18 and 18a so that the reciprocatory movements thereof will not interfere in the traveling of these belt members 18 and 18a. As best shown in Figure 3 of the drawings, the bushing 26 includes a circular fabric-engaging surface 26a, as well as a tapered internal surface 26b. In this manner, as the bushing 26 is moved upwardly of Figure 2, the fabric will be supported upon surface 26a thereof, and the upward movement of this will cause the fabric overlying the surface 26b to be pierced by the piercing surfaces 27a, 28a of twin knives 27 and 28. When such piercing has occurred and the bushing 26 has been returned to its position as shown in Figure 3, it is apparent that the fabric F will be retained in the elevated position shown as a result of the same being suspended on the support surfaces 27c, 28c of twin knives 27 and 28. In this manner, these surfaces 27c, 28c will support the fabric during the separating movement of the twin knives 27, 28; at which time the cutting action per se will be effectuated by the cutting surfaces 27b, 28b by these knife members 27, 28.

In use or operation of the improved cut-off device 10, it will first be assumed that a fabric ply F has been placed on the conveyor belts 16, 17, and upon operation of the rollers 14, 15 therefor in known manner, these belts will be moved so that the fabric F that is received thereon will be moved towards the frame member 21. When a sufficient length of fabric F has been played out, and with the cutter arm 30 positioned as shown in the full lines of Figure 1 of the drawings, the movement of the belts 16, 17 may be stopped, to result in a cessation of movement of the fabric F.

At this time, fabric F will overlie the bushing 26, and to effectuate a cutting action it is merely necessary that the piston 25 be operated to axially shift the bushing 26 upwardly so that the surface 26a thereof will lift the fabric F upwardly and cause a piercing of the same by surfaces 27a, 28a of twin cutting knives 27 and 28, which are at this time positioned in a condition of abutment with each other, as shown in Figure 2 of the drawings.

As previously indicated, this piercing movement will cause the fabric F to be supported on the "ledges" that are defined by the horizontal surfaces 27c, 28c of cutting knives 27, 28. With the fabric F thus positioned with respect to the cutting knives 27, 28, the piston 29 may be operated so that the end 29a moves to the left of Figure 2 of the drawings towards the position of Figure 3. This movement will result in a similar movement of gear rack 42, with the result that gear 43 and pulley 45 will rotate. The rotation of the pulley 45 will result in movement of belt 47, and as a result of this movement and the arrangement of the belt 47 over pulleys 45 and 46, the blocks 48 and 49 will be urged apart to cause a separating movement between the knives 27 and 28. This separating movement will operate to sever the fabric F between adjacent plies, with the cutting surfaces 27b, 28b effectuating the actual cutting of the fabric F that is supported on the respective ledge portions 27c, 28c.

When the knives have fully separated to the position of Figure 3, with the result that fabric F has been severed, the piston 29 may be returned to the position of Figure 2, and at this time the unused fabric may be withdrawn from table 11 and replaced on the appropriate supply roll therefor.

At this point in the construction of the pneumatic tire, it is normally desirable that the next ply be cut at an opposite bias angle; and accordingly, when the fabric F has been withdrawn, the piston 24 may be actuated so that the end 38 thereof moves the bell crank arm 33 to the chain-dotted line position of Figure 1 of the drawings, with the result that the cutter arm 30 will also at this time be disposed at a different oblique angle, as shown in the chain-dotted line position of Figure 1.

At this time, this fabric F having the cords thereof disposed at a different bias angle, may be placed on belts 16, 17 and advanced so as to underlie the cutter arm 30 in its new position; and upon correctly positioning the fabric ply F, the above cycle of operation, involving the separation of the twin cutting knives 27 and 28 may be repeated to effectuate another cutting operation.

It will be seen that as a result of employing a bell crank type of connection between the piston 24 and the cutter arm 30 that a small degree of tolerance is permissible in the degree of angular disposition of the cutting arm 30. This permissible variance of the oblique location of the cutter arm 30 in effect permits the knives 27 and 28 to "float" during the actual cutting process, with the result that irregularities in cord spacing may be compensated for without damage to the cord structure of the fabric ply F.

It will be seen from the foregoing that there has been provided a new and novel type of cut-off device for use in connection with the severance of fabric plies that have the cords thereof disposed at a bias angle. It has been shown how the arrangement of the twin cutting knives, so that the same in effect "work against each other," insures a smooth and uniform cutting of the rubber material that engages the adjacent cords. It has also been shown how the "floating" action of the cutter bar 30 permits adjustment of the cutting operation to compensate for irregularities in material; with the result that a clean severance of rubber material is always effectuated between adjacent cord members. It has also been shown how the operation and construction of the twin cutting knives insures a positive cutting action that results in an easily obtained and uniformly consistent cutting action of the rubber stock material that encases the fabric cords irrespective of the bias angle involved.

In the preceding specification, reference has been made in certain cases to specific compositions and configurations in order that the invention might be more clearly understood. It is to be understood that such specific recitation of composition and configuration, however, is done for the sake of clarity of disclosure and is not intended to limit the scope of the invention in any manner.

It accordingly follows that modifications of the invention may be resorted to without departing from the spirit thereof or the scope of the appended claims.

This application is a continuation in part of co-pending application Serial No. 470,918, filed November 24, 1954.

What is claimed is:

1. A fabric ply cut-off mechanism of the character described, comprising; a supporting surface for receiving fabric ply thereon; a pair of cutting knives, disposed above the plane of said supporting surface; lifting means, disposed substantially in the plane of said supporting surface; shifting means for moving said lifting means into and out of a position of projection beyond said supporting surface, whereby said fabric ply received on said supporting surface may be pierced upon contact with said cutting knives; support means defined by said knives and suspending said pierced fabric after withdrawal of said lifting means; and means for separating said knives after said fabric ply has been suspended thereon, whereby, upon retraction of said lifting means said fabric ply is severed by the movement of said knives.

2. A fabric ply cut-off mechanism of the character described, comprising; a supporting surface for receiving fabric ply thereon; at least one cutting knife, disposed above the plane of said supporting surface; lifting means disposed substantially in the plane of said supporting surface; shifting means for moving said lifting means into and out of a position of projection beyond said supporting surface, whereby fabric ply, carried by said supporting surface, may be pierced upon contact with said knife; support means defined by said knives and suspending said pierced fabric after withdrawal of said lifting means and means for moving said knife transversely of said supporting surface after said fabric has been suspended thereon, whereby, upon retraction of said lifting means said fabric ply is severed by the movement of said knife transversely of said supporting surface.

3. A fabric ply cut-off mechanism of the character described, comprising; a frame, having a movable supporting surface for receiving fabric ply thereon; a pair of cutting knives, disposed above said movable supporting surface; lifting means, disposed substantially in the plane of said supporting surface; shifting means for moving said lifting means into and out of a position of projection beyond said supporting surface, whereby said fabric ply carried on said supporting surface may be pierced upon contact with said knives; support means defined by said knives and suspending said pierced fabric after withdrawal of said lifting means; and means for separating said knives after said fabric ply has been suspended thereon, whereby, upon retraction of said lifting means said fabric ply is severed by the separating movement of said knives.

4. The device of claim 3 further characterized by the fact that said movable supporting surfaces are defined by a pair of endless belts, disposed in side-by-side relationship with each other and having said lifting means and said knives disposed on opposite sides thereof.

5. A fabric ply cut-off mechanism of the character described, comprising; a supporting surface for receiving fabric ply thereon; a pair of cutting knives, disposed above the plane of said supporting surface; lifting means, disposed substantially in the plane of said supporting surface; shifting means for moving said lifting means into and out of a position of projection beyond said supporting surface, whereby said fabric ply carried on said supporting surface may be pierced upon contact with said cutting knives; support means defined by said knives and suspending said pierced fabric after withdrawal of said lifting means; and means for separating said knives after said fabric ply has been suspended thereon, whereby, upon retraction of said lifting means said fabric ply is severed by the separating movement of said knives; each said cutting knife including a fabric supporting surface provided adjacent a cutting surface thereof.

6. A fabric ply cut-off mechanism of the character described, comprising; a supporting surface for receiving fabric ply thereon; at least one cutting knife, disposed above the plane of said supporting surface; lifting means disposed substantially in the plane of said supporting surface; shifting means for moving said lifting means into and out of a position of projection beyond said supporting surface, whereby fabric ply, carried by said supporting surface, may be lifted and pierced by said knife; means for retaining said fabric on said knife after piercing of said fabric ply; and means for moving said knife transversely of said supporting surface after said lifting means have raised the fabric ply, whereby upon retraction of said lifting means said fabric ply is severed by the movement of said knife transversely of said supporting surface; said lifting means being defined by a cylindrical body and having an open end portion capable of being passed about said cutting knives during axial movement of said cylindrical body upon energization of said lifting means, whereby fabric carried on said cylindrical body adjacent the open end thereof will be pierced by said cutting knives upon actuation of said lifting means.

7. A fabric ply cut-off mechanism of the character described, comprising; a frame, having a movable supporting surface for receiving fabric ply thereon; a pair of cutting knives, disposed above said movable supporting surface; lifting means, disposed substantially in the plane of said supporting surface; shifting means for moving said lifting means into and out of a position of projection beyond said supporting surface, whereby said fabric ply carried on said supporting surface may be pierced by said knives; support means defined by said knives and suspending said pierced fabric after withdrawal of said lifting means; and means for separating said knives after said fabric ply has been suspended thereon, whereby, upon retraction of said lifting means said fabric ply is severed by the separating movement of said knives; said means for separating said knives including a piston, a gear rack secured to the actuating end of said piston, a gear wheel engageable by said gear rack, and an endless belt keyed for rotational movement with said gear and having said knives secured to opposite courses thereof, whereby movement of said piston will operate to separate said knives.

8. A fabric ply cut-off mechanism of the character described, comprising; a supporting surface for receiving fabric ply thereon; a frame member, disposed transversely above said supporting surface; a pair of cutting knives, shiftably supported by said frame member; lifting means, disposed substantially in the plane of said supporting surface; shifting means for moving said lifting means into and out of a position of projection beyond said supporting surface and said frame member, whereby fabric ply received on said supporting surface may be pierced by said knives; support means defined by said knives and suspending said pierced fabric after withdrawal of said lifting means and means for moving said knives longitudinally of said frame member in separating movement with respect to each other after said fabric ply has been suspended thereon, whereby, upon retraction of said lifting means said fabric ply is severed by the separating movement of said knives.

9. The device of claim 8 further characterized by the presence of means for varying the angular disposition of said frame member over said supporting surface.

10. A fabric ply cut-off mechanism of the character described, comprising; a frame member; a movable supporting surface carried by said frame member and being defined by a pair of endless belts disposed in side-by-side relationship with each other; a cutter arm, disposed transversely of said frame above said supporting surface; a pair of cutting knives carried by said cutter arm in longitudinally shiftable relationship therewith; means for varying the angular disposition of said cutter arm transversely of said frame; lifting means, including a cylindrical body having an open end portion that is disposed substantially in the plane of said supporting surface; shifting means for moving said lifting means into and out of a position of projection beyond said supporting surface; support means defined by said knives and suspending said pierced fabric after withdrawal of said lifting means and means for separating said knives after said fabric ply has been suspended thereon, whereby, upon retraction of said lifting means said fabric ply may be severed by the separating movement of said knives.

11. A cutting knife for use with cut-off mechanisms of the character described, comprising; a thin blade having a substantially straight edge portion and having an opposed edge portion; said opposed edge portion including a piercing edge surface that extends angularly from said straight edge portion that defines therewith a piercing point at one extremity of said blade; a support surface adjoining one end of said piercing surface and extending transversely of said blade; and a cutting surface disposed in substantial parallelism with said straight edge portion and being disposed in substantially right-angle adjacency with one end of said support surface.

References Cited in the file of this patent

UNITED STATES PATENTS

| | | |
|---|---|---|
| 245,150 | Fowler | Aug. 2, 1881 |
| 245,152 | Fowler | Aug. 2, 1881 |
| 1,658,181 | Abbott | Feb. 7, 1928 |
| 1,728,163 | Maas | Sept. 10, 1929 |
| 2,071,097 | Wennberg | Feb. 16, 1937 |
| 2,665,757 | Stevens | Jan. 12, 1954 |